United States Patent
Hu et al.

(10) Patent No.: US 12,447,950 B2
(45) Date of Patent: Oct. 21, 2025

(54) METHOD AND DEVICE FOR PREVENTING A SUBJECT VEHICLE FROM DRIVING INTO A VEHICLE AHEAD, AS WELL AS VEHICLE AND ELECTRONIC PROCESSING UNIT

(71) Applicant: ZF CV Systems Global GmbH, Bern (CH)

(72) Inventors: Wei Hu, Garbsen (DE); Tim Koenings, Tettnang (DE); Richard Matthaei, Hameln (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 310 days.

(21) Appl. No.: 18/295,275

(22) Filed: Apr. 4, 2023

(65) Prior Publication Data

US 2023/0365127 A1    Nov. 16, 2023

(30) Foreign Application Priority Data

May 13, 2022    (DE) ...................... 10 2022 112 104.6

(51) Int. Cl.
*B60W 50/14*    (2020.01)
*B60W 10/06*    (2006.01)
(Continued)

(52) U.S. Cl.
CPC ............ *B60W 30/09* (2013.01); *B60W 10/06* (2013.01); *B60W 10/184* (2013.01);
(Continued)

(58) Field of Classification Search
CPC    G08G 1/166; G08G 1/16; G08G 1/00; G08G 31/00; B60W 30/09; B60W 10/06;
(Continued)

(56) References Cited

U.S. PATENT DOCUMENTS

| | | | | |
|---|---|---|---|---|
| 9,308,914 | B1* | 4/2016 | Sun | ................... B60W 60/0051 |
| 2008/0046145 | A1* | 2/2008 | Weaver | ..................... B60T 7/22 |
| | | | | 701/41 |

(Continued)

FOREIGN PATENT DOCUMENTS

| | | | | |
|---|---|---|---|---|
| CA | 3059951 | A1 * | 4/2021 | ............ B60Q 1/444 |
| DE | 102007060862 | A1 | 7/2009 | |

(Continued)

*Primary Examiner* — Tuan C To
(74) *Attorney, Agent, or Firm* — LEYDIG, VOIT & MAYER, LTD.

(57) ABSTRACT

A method for preventing a subject vehicle from driving into a vehicle ahead includes equipping the subject vehicle with at least one brake system, a drive system and a driver assistance system with an emergency braking function. The method also includes issuing a haptic warning when the subject vehicle enters a distance warning zone, applying emergency braking on entering an emergency braking zone, and calculating a relative speed between the subject vehicle and the vehicle ahead. The method includes continuously calculating a time to collision (TTC) when approaching the vehicle ahead, specifying a first TTC threshold value for adaptive classification of a distance from the subject vehicle to the vehicle ahead, checking, when approaching the vehicle ahead, whether the TTC falls below the first TTC threshold value, and, if the TTC falls below the first TTC threshold value, issuing a haptic warning to a driver of the vehicle.

15 Claims, 10 Drawing Sheets

(51) Int. Cl.
*B60W 10/184* (2012.01)
*B60W 30/09* (2012.01)
*B60W 30/16* (2020.01)
*G08G 1/16* (2006.01)

(52) U.S. Cl.
CPC ............ *B60W 30/16* (2013.01); *B60W 50/14* (2013.01); *G08G 1/166* (2013.01); *B60W 2050/146* (2013.01); *B60W 2420/403* (2013.01); *B60W 2420/408* (2024.01); *B60W 2510/0657* (2013.01); *B60W 2554/80* (2020.02)

(58) Field of Classification Search
CPC .... B60W 10/184; B60W 30/16; B60W 50/14; B60W 2554/80; B60W 2420/408; B60W 2050/146; B60W 2420/403; B60W 2510/0657; G05D 1/622; B60T 8/1755; B60Q 9/00; B60Q 9/002; B60Q 9/008; G01S 13/931
USPC .......................................................... 701/26
See application file for complete search history.

(56) References Cited

U.S. PATENT DOCUMENTS

| | | | |
|---|---|---|---|
| 2012/0166057 A1 | 6/2012 | Amato et al. | |
| 2014/0136044 A1* | 5/2014 | Conrad | G01S 13/931 701/23 |
| 2015/0025784 A1* | 1/2015 | Kastner | G08G 1/166 701/119 |
| 2018/0162387 A1* | 6/2018 | Sung | B60W 30/09 |
| 2022/0187449 A1* | 6/2022 | Laoufi | B60W 50/14 |
| 2022/0234556 A1* | 7/2022 | Yang | B60T 8/171 |

FOREIGN PATENT DOCUMENTS

| | | | | |
|---|---|---|---|---|
| DE | 102012025468 A1 | 7/2014 | | |
| DE | 102011121041 B4 | 10/2020 | | |
| EP | 1437254 A1 | 7/2004 | | |
| EP | 1889765 A1 * | 2/2008 | ................ | B60T 7/22 |
| EP | 2835794 A1 * | 2/2015 | ............. | G08G 1/166 |
| EP | 3539837 A1 * | 9/2019 | .......... | B60W 30/095 |

* cited by examiner

METHOD AND DEVICE FOR PREVENTING A SUBJECT VEHICLE FROM DRIVING INTO A VEHICLE AHEAD, AS WELL AS VEHICLE AND ELECTRONIC PROCESSING UNIT

CROSS REFERENCE TO RELATED APPLICATIONS

This application claims benefit to German Patent Application No. DE 10 2022 112 104.6, filed on May 13, 2022, which is hereby incorporated by reference herein.

FIELD

The present invention relates to vehicles equipped with an automatic distance control system.

BACKGROUND

Automatic distance control systems are often referred to internationally as ACC systems, corresponding to "adaptive cruise control" systems. The ACC systems fall under the category of advanced driver assistance systems. More specifically, an ACC system concerns a cruise control system in motor vehicles that includes the distance to a vehicle ahead as an additional feedback and control variable. In this way, a safety distance can be maintained. Modern ACC systems also offer the driver the option of selecting the desired distance to the vehicle ahead. This can be done in a control menu that is displayed on a display unit. To select the distance, a button on a steering wheel control unit is often used.

Such ACC systems increase the comfort of the driver. Especially on long motorway journeys, they can relieve the driver by freeing him from the task of frequent braking and accelerating of the vehicle in order to maintain a certain distance. However, the same applies to less fluid city traffic. Secondarily, there is also an increase in safety due to the fact that the driver tires less quickly by not having to concentrate as much to maintain the distance.

For distance measurement, radar sensors are mainly used in today's ACC systems, lidar systems can also be used, but are not yet so widespread. Cameras are also used for better object recognition and for the recognition of the traffic lanes. The distance to the vehicle ahead can also be measured by camera. However, the use of a stereo camera is advantageous for this.

Such ACC systems are used in various vehicle categories. This includes passenger vehicles, including motorcycles, camping vehicles and commercial vehicles such as buses, trucks, agricultural machines, such as tractors, combine harvesters, shredders, forestry equipment, etc.

In addition, some manufacturers also offer so-called anti-collision systems or emergency brake systems, which, in addition to the ACC system, monitor the distance/time gap or time-to-collision (TTC) to the vehicle ahead. They warn the driver in critical situations and, if necessary, also take countermeasures to prevent too close an approach from the rear or a collision or to mitigate its consequences. They can work with the same sensors as the ACC systems.

An ACC system with a stop & go function is known from the document EP 1 437 254 A1. The ACC system is designed for speeds below 50 km/h. The ACC system is equipped with a selection switch that can be used to select a desired distance to the vehicle ahead. As an example, 3 selection intervals are provided. The vehicle therefore starts up again automatically when the vehicle ahead comes to a standstill, but then starts moving again.

From the document DE 10 2011 121 041 B4 an anti-collision system is known, which is designed for commercial vehicles. In this anti-collision system, the space between the subject vehicle and the vehicle ahead is permanently divided into different zones. There is a safe zone that extends within a distance of for example 16 m and more to the vehicle ahead. If the subject vehicle is in the safe zone, neither a warning nor a mitigation measure is initiated. The safe zone is connected to a so-called accelerator pedal override zone, which concerns, for example, the distance between 12 m and 16 m away from the vehicle ahead. If the subject vehicle enters this zone, the engine of the subject vehicle is throttled. This is followed by a retarder zone between 6 m and 12 m distance. If the subject vehicle enters the retarder zone despite engine throttling, the endurance brake, i.e. the retarder of the subject vehicle, is actuated and the subject vehicle is braked more strongly. If this braking effect is still not sufficient and the subject vehicle even enters a so-called keep clear zone of less than 6 m distance, the service brakes of the subject vehicle are also actuated as a further mitigating measure and emergency braking takes place.

One problem with this anti-collision system is that the zoning is static, regardless of the relative speed between the subject vehicle and the vehicle ahead. The countermeasures are only initiated in a small range of relative speeds, for example when the approach velocity is in the range of less than 5 mph, when the distance between the vehicles is no longer in the safe range and only while the ACC system is turned off. Otherwise, it will rely on the response of the ACC system when it is switched on and on the response of an emergency brake system, which will not work when the relative speed is small.

There is therefore a need for improvements in such anti-collision systems in the sense that both for operation with ACC and for manual driving, seamless system availability is provided over the parameter space of relative speed or TTC from the driver's point of view and in particular the anti-collision system and the emergency brake system AEBS, corresponding to Advanced Emergency Brake system, mesh seamlessly without "control gaps".

SUMMARY

In an embodiment, the present disclosure provides a method for preventing a subject vehicle from driving into a vehicle ahead, comprises equipping the subject vehicle with at least one brake system, a drive system and a driver assistance system with an emergency braking function, issuing a haptic warning when the subject vehicle enters a distance warning zone, and applying emergency braking on entering an emergency braking zone. The method further comprises calculating a relative speed between the subject vehicle and the vehicle ahead, continuously calculating a time to collision (TTC) when approaching the vehicle ahead, the TTC indicating a remaining time until the subject vehicle collides with the vehicle ahead at the relative speed, and specifying a first TTC threshold value for adaptive classification of a distance from the subject vehicle to the vehicle ahead. The method further comprises checking, when approaching the vehicle ahead, whether the TTC falls below the first TTC threshold value, and, if the TTC falls below the first TTC threshold value, issuing a haptic warning to a driver of the vehicle.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
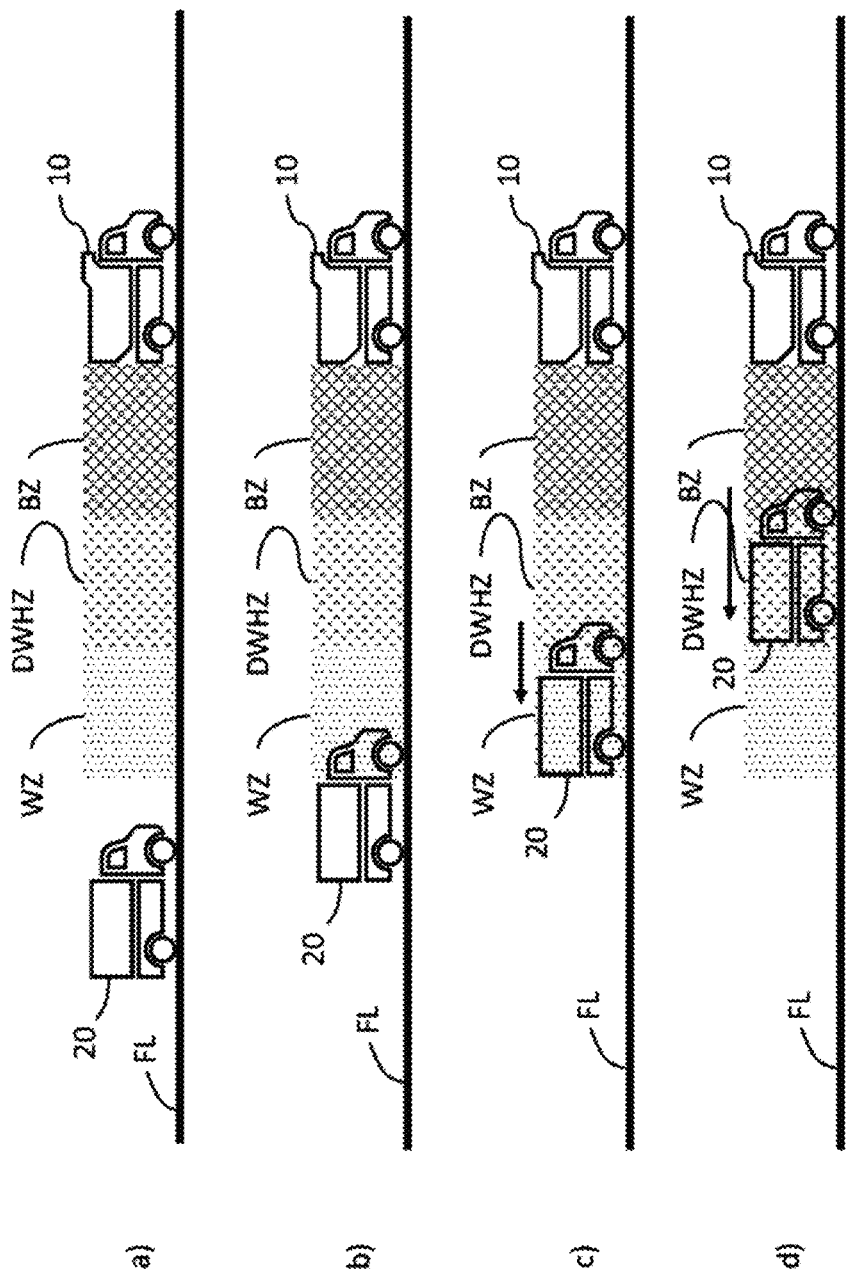
FIGS. 1 a-1d show driving through different zones when a subject vehicle is approaching a vehicle ahead.

In an embodiment, the present invention provides an anti-collision system that solves the problem of the improper functioning of the existing anti-collision system and thus eliminates the need for the use of a separately adapted anti-collision system in a small range of relative speeds.

This is achieved by a method for regulating the distance between a subject vehicle and a vehicle ahead according to embodiments of the present disclosure.

In an embodiment, the invention relates to a method for preventing a subject vehicle from driving into a vehicle ahead, wherein the subject vehicle is equipped with at least one brake system including an emergency braking function AEBS, a drive system and a driver assistance system with a warning function. The driver assistance system with a warning function is designed in such a way that when the subject vehicle enters a distance warning zone, a visual and/or acoustic warning is issued, and a haptic warning is issued in a second step. On entering an emergency braking zone, the AEBS system then carries out emergency braking. For this purpose, a relative speed between the subject vehicle and the vehicle ahead is calculated, and a time-to-collision (TTC) is continuously calculated when approaching the vehicle ahead, which indicates the remaining time until the subject vehicle collides with the vehicle ahead at the current relative speed.

In addition to this emergency brake system AEBS, a step-by-step intervention by the anti-collision system is now also carried out according to an embodiment of the invention when a speed-adaptive safety distance is violated.

According to an embodiment of the invention, the different zones are determined adaptively contrary to the solution in DE 10 2011 121,041 B4. A first TTC threshold value is specified for the adaptive classification of the distance between the subject vehicle and the vehicle ahead. When approaching the vehicle ahead, it is checked whether the current TTC falls below the first TTC threshold, and if so, a haptic warning is issued to the driver of the vehicle. If the vehicle ahead is approached still further, the drive torque continues to be throttled. In addition, however, the AEBS emergency brake system would then become active and initiate emergency braking, wherein throttling of the drive torque would also be carried out. So there is still an overlap of functions, which may interfere with each other.

The haptic warning is brought about in an advantageous manner by a braking process in order to produce a noticeable braking jolt for the driver. In this phase, this does not have to be done by applying the service brake, but can be done, for example, by throttling the engine or switching on a retarder. This also has the advantage that energy is already dissipated in the haptic warning phase. The haptic warning is issued when approaching the vehicle ahead. Since this could be a critical approach that could result in a rear-end collision, it is advantageous when kinetic energy is dissipated at an early stage.

In a refined embodiment, a second TTC threshold value is specified. The haptic warning is only generated if the current TTC falls below the first TTC threshold value but does not fall below the second TTC threshold value. In this way, the overlap of the emergency braking function with the distance warning function can be prevented. This solution has the advantage that it can be adjusted so that it can be used consistently in all distance ranges and relative speed ranges, so that the need to develop and implement special functions for a specific range of low relative speeds is eliminated. The zoning is carried out adaptively by referring to TTC threshold values, so that at higher relative speeds larger distance values for the zoning apply than at lower relative speeds.

It is also advantageous if the haptic warning is issued as long as the subject vehicle is in the range from the first TTC threshold value to the second TTC threshold value. Due to issuing the haptic warning in the form of a braking process, the speed of the subject vehicle changes constantly. As a result, the TTC value is also constantly changing. As long as the changing TTC value still changes in the range between the first and second TTC values, the haptic warning is issued. Thus, the entire phase in which the TTC value drops from the first TTC value to the second TTC value is used to carry out the haptic warning process. Thus, the urgency of this warning is also made clear to the driver of the vehicle by the fact that the warning lasts longer. As a result, the driver cannot rely on the criticality of the situation decreasing when the warning phase is still ongoing. Rather, he should devote his full attention to the traffic situation in order to intervene at an early stage and defuse the situation.

Here, the haptic warning in the form of the braking process is preferably generated by throttling the engine torque of the drive system and/or by actuating a service brake or an endurance brake. These are special options that can be easily implemented in practice in order to produce the noticeable braking jolt.

The measure of throttling the engine torque is the milder variant of generating a braking jolt, wherein a stronger braking jolt can be produced with the actuation of the endurance brake and with the actuation of the service brake an even stronger braking jolt can be produced. The method according to an embodiment of the invention could therefore also be designed in such a way that further TTC threshold values are defined and, depending on the threshold value reached, different haptic warnings are issued, which are increasingly stronger in their sequence, the closer the TTC value is to the TTC threshold value for triggering the emergency braking process.

In a preferred variant, the strength of the throttling of the engine of the drive system and/or the strength of the braking by means of the endurance brake and/or the service brake is distributed in proportion to the further approach of the subject vehicle to the vehicle ahead. This means that the further the subject vehicle enters the distance range until emergency braking is triggered, the greater the throttling of the engine. This also has the advantage that the driver can recognize the urgency of the warning by the fact that the strength of the braking increases.

For the practical realization of this type of haptic warning, it is advantageous if the strength of the throttling of the engine torque of the drive system (PTS) is calculated according to the formula $$RM\% = 100\% \cdot \left(1 - \frac{TTC_{Sw1} - TTC_{Calc}}{TTC_{Sw1} - TTC_{Sw2}}\right),$$

wherein RM % is the permissible proportion of a reference engine torque of the engine of the drive system as a percentage of the reference engine torque, wherein $TTC_{Sw1}$ corresponds to the first threshold value, wherein $TTC_{Calc}$ corresponds to the calculated current TTC, and wherein $TTC_{Sw2}$ corresponds to the second threshold value. With this form of implementation, the driver can request the engine torque up to the calculated percentage value. If he also wants to request more engine torque, this is prevented. The further (distance) and the faster (relative speed) the subject vehicle approaches the vehicle ahead, the stronger the limitation. Up to the condition characterized by the second TTC threshold, the engine torque is completely removed. The proportion of the removal of the requested engine torque increases linearly in this variant. Alternatively, other variants are possible with which a different type of increase is selected. For example, a parabolic increase up to an exponential increase would be feasible.

This TTC-based intervention with two or more TTC threshold values closes the specification gap of an anti-collision system to the AEBS emergency brake system. However, an exclusively TTC-based intervention is functionally limited in two respects:
1. With the brake intervention, the TTC changes by changing the relative speed. As a result, the haptic warning phase may be interrupted even though the subject vehicle is still driving far too close behind the vehicle ahead.
2. Theoretically, it is possible that situations arise (for example a short-distance-cut-in) in which the subject vehicle has a very small distance to the vehicle ahead, but with a non-critical TTC (i.e. either the same speed as the vehicle ahead or the subject vehicle is slightly slower than the vehicle ahead). In this case, the criticality can be described by the time gap, i.e. a speed-dependent distance. If a time gap of 1.3 s is calculated, this means that the subject vehicle reaches the position of the vehicle ahead in 1.3 s at its current speed. The driver has only 1.3 seconds to react when the vehicle ahead brakes.

Therefore, it is advantageous according to an embodiment of the invention to introduce, instead of the real TTC with the vehicle ahead, a virtual TTC to an adaptive safety distance in the form of a defined time gap to the vehicle ahead. The aforementioned calculation rule changes as follows:

$$RM\% = 100\% \cdot \left(1 - \frac{TTC_{Sw1} - \frac{\Delta s - T_{Gap} \cdot v_{Ego}}{\Delta v}}{TTC_{Sw1} - TTC_{Sw2}}\right)$$

where $T_{Gap}$ is introduced as a design parameter for the safety distance (time gap) and $v_{Ego}$ as a measured intrinsic velocity. The value of $\Delta s/\Delta v$ corresponds to the value $TTC_{Calc}$ contained in the formula given previously.

This solution ensures that even at low relative speeds, the anti-collision system addresses/demands a speed-dependent safety distance. This prevents situations with high criticality that can otherwise occur at very short distances to the vehicle ahead, as described above, at low relative speeds.

In addition, in an extended embodiment, the haptic warning to the driver of the subject vehicle can be accompanied by a warning display on a display unit and optionally enriched with issuing an acoustic warning.

Another advantageous supplementary option is to give the driver of the subject vehicle a warning on a display unit and/or via an acoustic output unit without producing a noticeable braking jolt when the subject vehicle enters a further distance warning zone extending even before the distance warning zone.

Another embodiment of the invention consists of a device for preventing a subject vehicle from driving into a vehicle ahead, wherein the subject vehicle is equipped with at least one brake system, a drive system and a driver assistance system with an emergency braking function. In this case, the driver assistance system comprises an electronic processing unit which is connected via one or more communication buses to at least one electronic control unit of the drive system and at least one electronic control unit of the brake system. Furthermore, the electronic processing unit is connected to at least one sensor unit, in particular a camera and radar sensor. According to an embodiment of the invention, the electronic processing unit is set up to calculate, with the data of the at least one sensor unit, a TTC that indicates the remaining time until the subject vehicle collides with the vehicle ahead at the existing relative speed. In addition, the processing unit is set up to send a command to reduce the drive torque to the electronic control device of the drive system when the electronic processing unit has determined that the subject vehicle has entered a distance warning zone by comparing the current TTC with a first TTC threshold value. This results in a haptic warning for the driver of the vehicle.

Furthermore, the processing unit is set up to send a command to the electronic control unit of the brake system, with which a service brake of the brake system is actuated, if the electronic processing unit has determined by comparing the current TTC with a second TTC threshold value that the subject vehicle has entered an emergency braking zone. In addition, a vehicle endurance brake can also be applied in this phase. Such endurance brakes are present, for example, in larger commercial vehicles, for example heavy trucks, and serve to relieve the service brakes. If an endurance brake is present, it can be applied alternatively or in addition to throttling the engine torque to issue the haptic warning in the warning phase.

For the device, it is further advantageous if a radar sensor or a lidar sensor and a camera sensor is provided as the sensor unit, wherein the camera sensor may optionally be implemented as a stereo camera sensor. The radar sensor has its strengths in measuring distances and relative speeds. The lidar sensor can also detect distances as well as 3D shapes very well. The camera sensor has its strengths in the classification of objects and measurement of lateral variables. The stereo camera can also be used to capture distances and 3D shapes. By combining the measurement results from different sensors, for example by sensor fusion, the accuracy of the measurement results can be increased.

The camera can be used, for example, to check the plausibility of object detection by the radar system. This makes it easier to determine the type of vehicle ahead. The camera is also used, for example, to regulate compliance with the traffic lanes when the vehicle is equipped with a lane keeping assistant. The lidar sensor can also be used to check the plausibility of object detection. The use of sensor fusion technology can increase the accuracy of the classification of objects in some situations. This is always an advantage if there are deteriorated measurement conditions for one of the sensors. The weather conditions are crucial here. In the dark, the evaluation of the camera images is difficult. In rain, fog and snowfall, the accuracy of lidar sensors can be affected. But also those of the camera. This is where the radar sensor can help.

The driver assistance system may be designed in a preferred variant as an adaptive cruise control system with an emergency braking function.

In order to exploit the increased computing power of the cruise control system, it is advantageous if the camera sensor is integrated in one device together with the cruise control system. The increased computing power of the processor in the cruise control system can be used, for example, to process the various object recognition algorithms.

A further embodiment of the invention consists of a vehicle with a drive system, an electronically controlled brake system and with a device according to an embodiment of the invention.

Finally, an embodiment of the invention also consists of an electronic processing unit which can be connected via one or more communication buses to an electronic control unit of the drive system and at least one electronic control unit of the brake system and at least one sensor unit and is set up to communicate with the electronic control unit of the drive system and the electronic control unit of the brake system and the at least one sensor unit to receive sensor data and to transmit control commands to the electronic control unit of the brake system and the electronic control unit of the drive system such that the method according to an embodiment of the invention can be carried out.

The present description illustrates the principles of the disclosure according to embodiments of the invention. It is therefore understood that those skilled in the art will be able to design various arrangements, which are not explicitly described herein, but which embody principles of the disclosure according to embodiments of the invention and should also be protected in their scope.

Embodiments of the invention are described below using the example of a commercial vehicle (truck).

FIGS. 1a-1d show the approach of a subject vehicle 20 to a vehicle ahead 10 in different stages of the approach. Both vehicles are commercial vehicles. However, it should be noted that they could be other types of vehicles. Such situations occur in many ways in normal traffic. On motorways, for example, a scenario is particularly dangerous when vehicles drive closely behind each other over long distances at approximately the same speed. If such a convoy, then approaches the end of a traffic jam of which the drivers are not aware, dangerous situations can occur, including rear-end collisions if the drivers notice the situation too late. For this reason, anti-collision systems have been developed to mitigate such situations as far as possible. The basic functionality of these anti-collision systems is shown in FIG. 1. Both vehicles 10, 20 are on the same road surface FL. In FIG. 1a, the subject vehicle 20 is still so far away from the vehicle ahead 10 that it is in a safe zone. Here, the anti-collision system is not active. In FIG. 1a, a classification of the distance range between the subject vehicle 20 and the vehicle ahead 10 into different zones is already shown. The reference sign WZ marks a first distance warning zone. The subject vehicle first enters this first distance warning zone WZ if the subject vehicle 20 continues to approach the vehicle ahead 10. The first warning zone WZ is followed by a second warning zone DWHZ. If the subject vehicle 20 also reaches the second level warning zone DWHZ as a result of the approach, a more urgent warning can be issued. The second distance warning zone DWHZ is followed by a braking zone BZ. This extends from the end of the second distance warning zone DWHZ to the end of the vehicle ahead 10. In FIG. 1b it is shown that the subject vehicle 20 has further approached the vehicle ahead 10 and has entered the first warning zone WZ. As a countermeasure, the anti-collision system issues a warning, which is displayed, for example, on a display unit. In addition, a voice output of the warning can be provided. Instead of the voice output, an acoustic warning tone could also be generated. If the subject vehicle 20 continues to approach the vehicle ahead 10 despite the warning, the subject vehicle 20 next enters the second distance warning zone RZ. This is shown in FIG. 1c. At this stage of the approach, a braking jolt is produced by the anti-collision system, which is intended to convey a more severe warning to the driver of the subject vehicle 20. The subject vehicle 20 thereby experiences a braking acceleration, which is indicated by an arrow above the subject vehicle 20. This braking acceleration is noticeable to the driver, so that if he has overlooked or ignored the warning that has already been issued, he is made even more aware of the possible dangerous situation. Finally, FIG. 1d shows the case whereby the subject vehicle 20 also enters the braking zone BZ, which extends directly to the vehicle ahead 10. If the anti-collision system detects this, emergency braking is carried out as a further countermeasure. As a result, the subject vehicle 20 is braked even more. The even stronger braking acceleration is indicated above the subject vehicle 20 with a second arrow. The length of the second arrow shows that the braking acceleration during emergency braking is higher than when the braking jolt was produced in the previous warning zone DWHZ. The representation in FIG. 1 was chosen such that the vehicle ahead 10 has already come to a standstill. Thus, this vehicle 10 would mark the end of the traffic jam when approaching the end of a traffic jam. The same principle of the sequence of warnings and the emergency braking can also be used in the case of a moving vehicle ahead 10 when a subject vehicle 20 is approaching.

Figure 2:
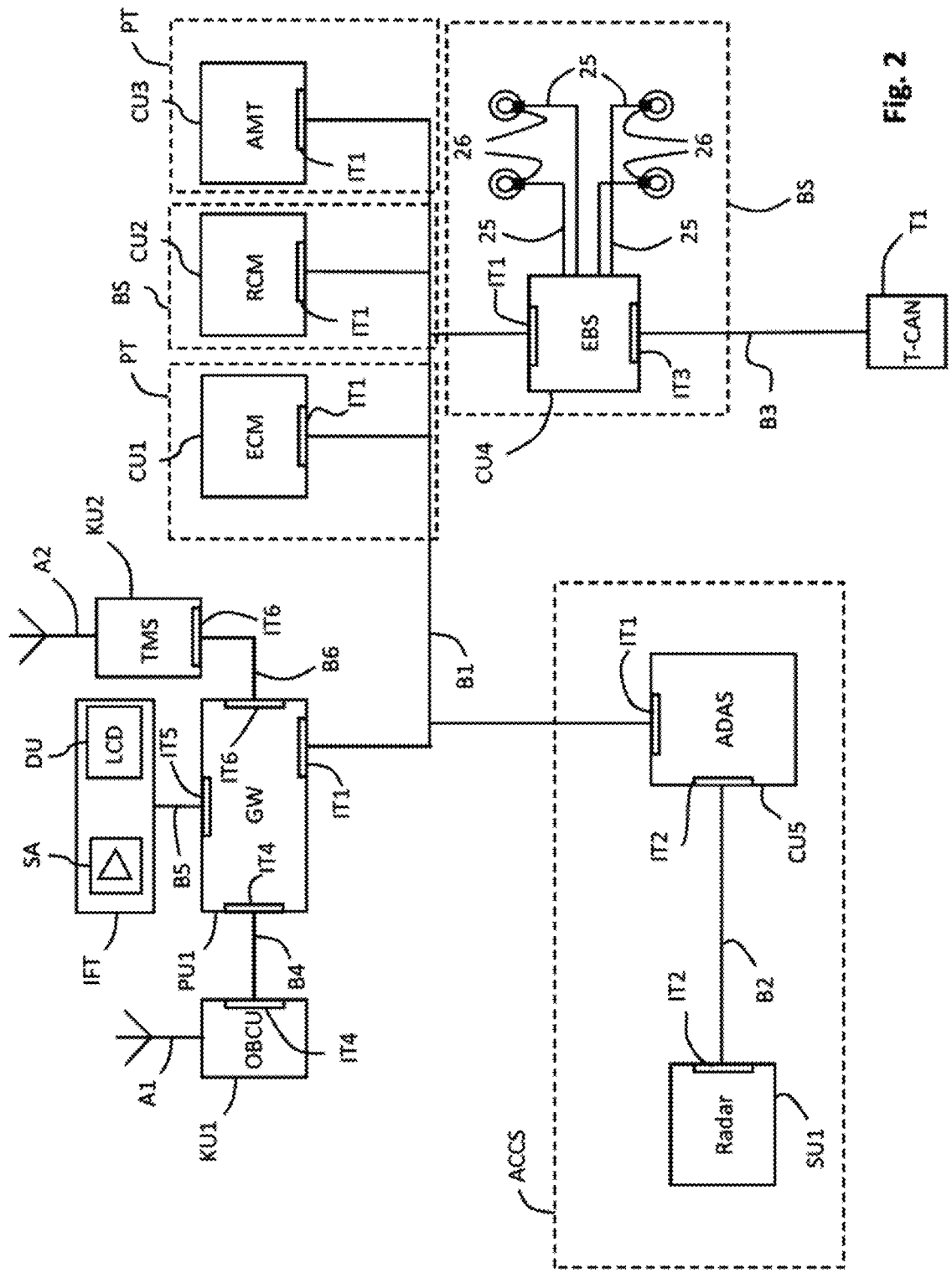
FIG. 2 shows a block diagram for the electronic equipment of a commercial vehicle.

FIG. 2 shows a part of the on-board electronics of the subject vehicle 20. This is equipped with a cruise control system ACCS, corresponding to the Adaptive Cruise Control System. With this, the desired control speed and a desired following distance can be entered via a steering wheel control unit. This typically also allows an incremental adjustment of the set speed and the following distance.

Various electronic control units are part of the illustrated part of the on-board electronics. The block CU1 refers to an electronic motor controller ECM, corresponding to "Engine Control Module". The block CU2 refers to an electronic control unit of the retarder unit. This is used to support a braking process and can prevent overheating of the friction brakes on the wheels. Such a retarder unit is typically installed in heavy commercial vehicles. The block CU3 refers to an automatic transmission control unit AMT, corresponding to "Automated Manual Transmission". The block CU4 designates an electronic brake control unit EBS, corresponding to "Electronic Braking system". The reference number 26 shows one service brake per wheel. Each service brake 26 can be operated separately by the electronic brake control unit EBS. For this purpose, the corresponding brake lines 25 are connected to the electronic brake control unit CU4. The brake system BS includes both the retarder unit CU2 and the electronic brake control unit CU4 with the connected brake lines 25 and the service brakes 26.

The block CU5 refers to an electronic processing unit of a driver assistance system ADAS, corresponding to "Advanced Driving Assistance System". It can be the mentioned ACC system, for example, i.e. the automatic distance control system that automatically maintains the distance to the vehicle ahead 10. In the case shown, a camera sensor is also integrated with the processing unit CU5 in a device. Further components are connected to the processing unit CU5. which together with the processing unit CU5 form the ACC system ACCS. As an example, a radar sensor SU1 is shown, which is connected to the processing unit CU5 via a separate communication bus B2. For this purpose, both components radar sensor SU1 and processing unit CU5 are equipped with the corresponding communication interface IT2. An example is a communication bus B2 according to the CAN bus, corresponding to Controller Area Network.

The reference sign PU1 refers to a gateway unit. This is connected to two different on-board communication units KU1 and KU2 via the communication buses B4 and B6. The on-board communication device KU1 can be in the form of an LTE or 5G modem or of a WLAN module. This is used to communicate with devices that are connected to the Internet or another public communication network. The antenna of the on-board communication unit KU1 is referred to by reference sign A1. It also handles data traffic to other vehicles, also known as V2V communication, corresponding to vehicle-to-vehicle, or to stationary infrastructure devices, corresponding to V2X communication. For communication with other vehicles, the so-called "sidelink" communication capability of the LTE modem or the so-called "PC5" communication capability of the 5G modem can be used for this purpose. V2X communication, corresponding to vehicle-to-everything, can also be handled via a WLAN module.

The on-board communication device KU2 supplies the towing vehicle 20 with telematics data. This includes, for example, the well-known applications from the logistics sector, such as toll collection, but also data that serves to control the flow of traffic. It can be, for example, a GSM module. The antenna of the on-board communication unit KU2 is designated with reference sign A1. Other electronic components can also be connected to the central gateway PU1. As an example, the electronic devices of an infotainment system IFT are mentioned. This includes, for example, the components navigation device, radio, telephone, as well as a touchscreen display device for operation by and information of the driver. A so-called body control module can also be connected to the gateway unit PU1. This is used to receive and implement the various settings of components that can be operated by the driver. Examples include windscreen wipers, windscreen washer systems, door locks, various lamps and indicators, power windows, seat adjustment motors, air conditioning, etc. The steering wheel control unit already mentioned can also be connected to the gateway unit PU1. If the bus systems connected to the gateway unit PU1 are different bus systems for reception and forwarding, the gateway station is set up to perform the necessary protocol conversion.

The components display unit DU and voice output unit SA in the infotainment system IFT are shown separately. This is advantageously arranged as a touch-sensitive display unit (touch screen) in the cockpit of the commercial vehicle 20. This allows a variety of operations to be carried out. For this purpose, operating menus are displayed on the display unit DU1. The driver can select menu items, change parameter settings and make entries, as is known from smartphones or tablets, for example. The display unit DU could also be connected to the gateway unit PU1 via another bus connection. In this way, the display data are transmitted, and the operating commands and inputs entered by the driver are transmitted from the display unit DU to the gateway unit PU1. As an example, the LVDS bus system is mentioned, corresponding to (Low Voltage Differential Signaling), which was developed for these purposes and can be used here.

To connect to the gateway unit PU1, the on-board communication module KU1 is equipped with a communication interface IT4. The on-Board communication module KU2 is also equipped with a communication interface IT6. The components of the infotainment system IFT are each equipped with a communication interface IT5. The gateway unit PU1 has the corresponding communication interfaces IT4 to IT6. The communication interfaces IT4 to IT6 can also be designed identically if the same communication buses are used. As an example of a communication system used in the infotainment sector, the well-known Ethernet bus is mentioned.

The electronic control units CU1 to CU5 and the electronic processing unit PU1 are networked with each other via a bus system B1. For this purpose, a bus system designed for in-vehicle communication can be used. Typically, serial bus systems are used for this purpose, as they have the lowest cabling effort. Possible examples are a CAN bus system, corresponding to Controller Area Network. There are different variants of the CAN bus system such as CAN Low Speed and CAN High Speed for different data rates from 125 Kbit/s to 1000 Kbit/s. Furthermore, an extended CAN bus was specified with the designation CAN-FD bus, where FD stands for "Flexible Data Rate". This specification defines an extended data frame with higher transport capacity where the payload field is enlarged. Two other motor vehicle bus systems are known with the designations Flexray and Automotive Ethernet, which can also be used for networking electronic control units.

Figure 3:
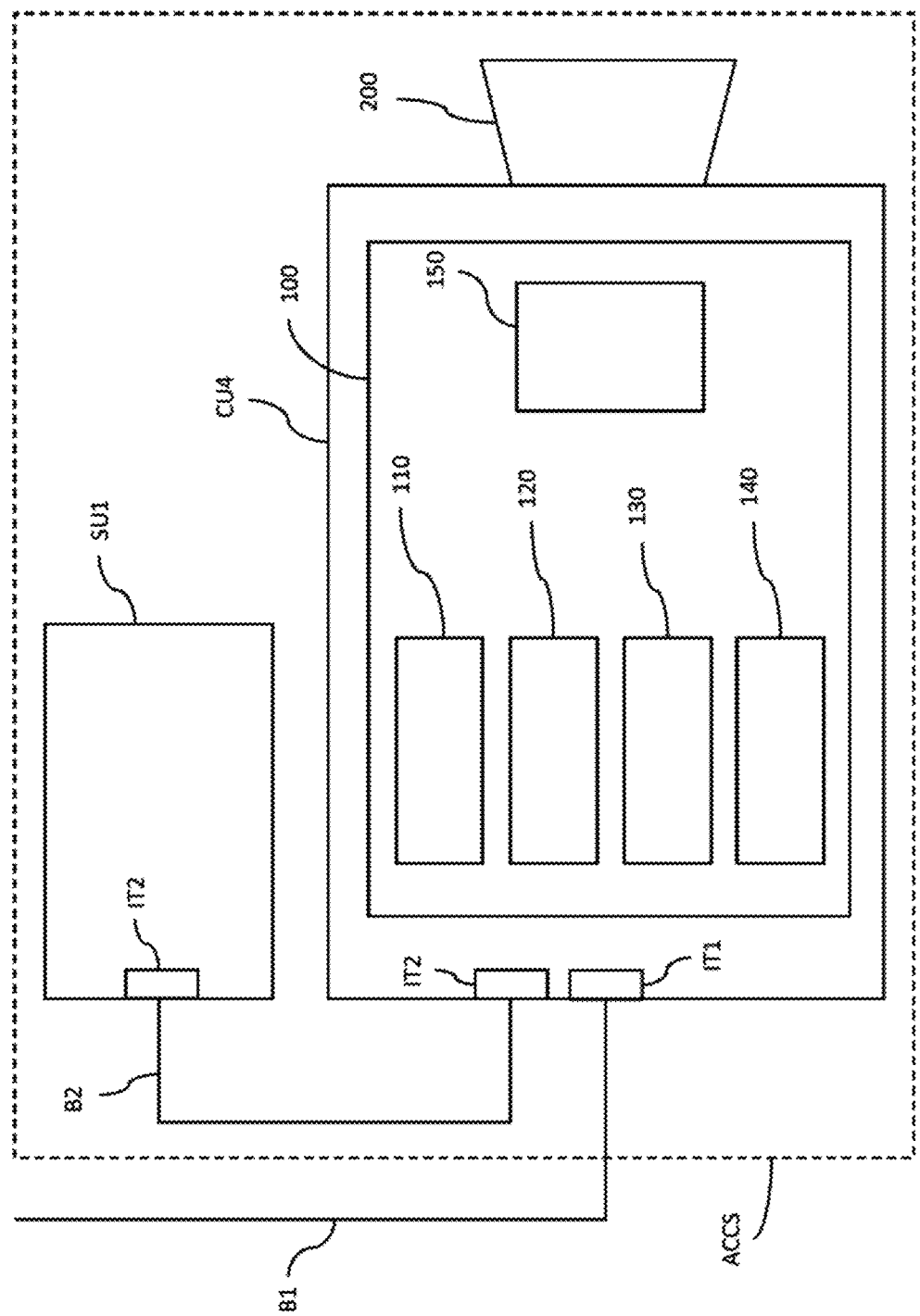
FIG. 3 shows a block diagram for a driver assistance system of a vehicle.

FIG. 3 shows the driver assistance system ACCS separately. Therein, the same reference signs designate the same components as in FIG. 2. Particularly noteworthy is the integration of the camera sensor with the electronic control unit CU5. The camera lens with the image sensor is provided with the reference number 200. The reference number 100 designates a processor unit in the electronic control unit CU5. The reference number 150 designates a functional unit in which the object recognition algorithms are combined, with which the image data of the image sensor are evaluated. These are forwarded to the functional unit 110. This corresponds to a data fusion unit. The object data detected by the radar sensor SU1 are also supplied to these via the communication bus B2. Data fusion is carried out for the corresponding objects. This technique is well known. It is also known as sensor data fusion. With this technique, the reliability of object recognition and the accuracy of object recognition can be increased by merging the object recognition data. The functional unit 120 is used to implement the functionalities of the ACC cruise control system. The functional unit 130 is used to implement the haptic warning functions in the event of a critical approach to the vehicle ahead 10. These are also referred to as DWH functions, corresponding to "Distance Warning Haptic". The functional unit 140 is used to implement the emergency braking function in the event of an even more critical approach to the vehicle ahead 10.

In the following, the functions of the different functional units are described in more detail. The functions of the speed control system of the function block 120 correspond to those of an adaptive cruise control system ACC and are well known. It is about maintaining the distance to a vehicle ahead 10, even with changes in the traffic flow. For this purpose, this function block generates control commands for the electronic control unit CU1 of the drive system PT to throttle the subject vehicle 20 when the vehicle ahead 10 reduces its speed or to accelerate when the vehicle ahead 10 increases its speed.

Figure 4:
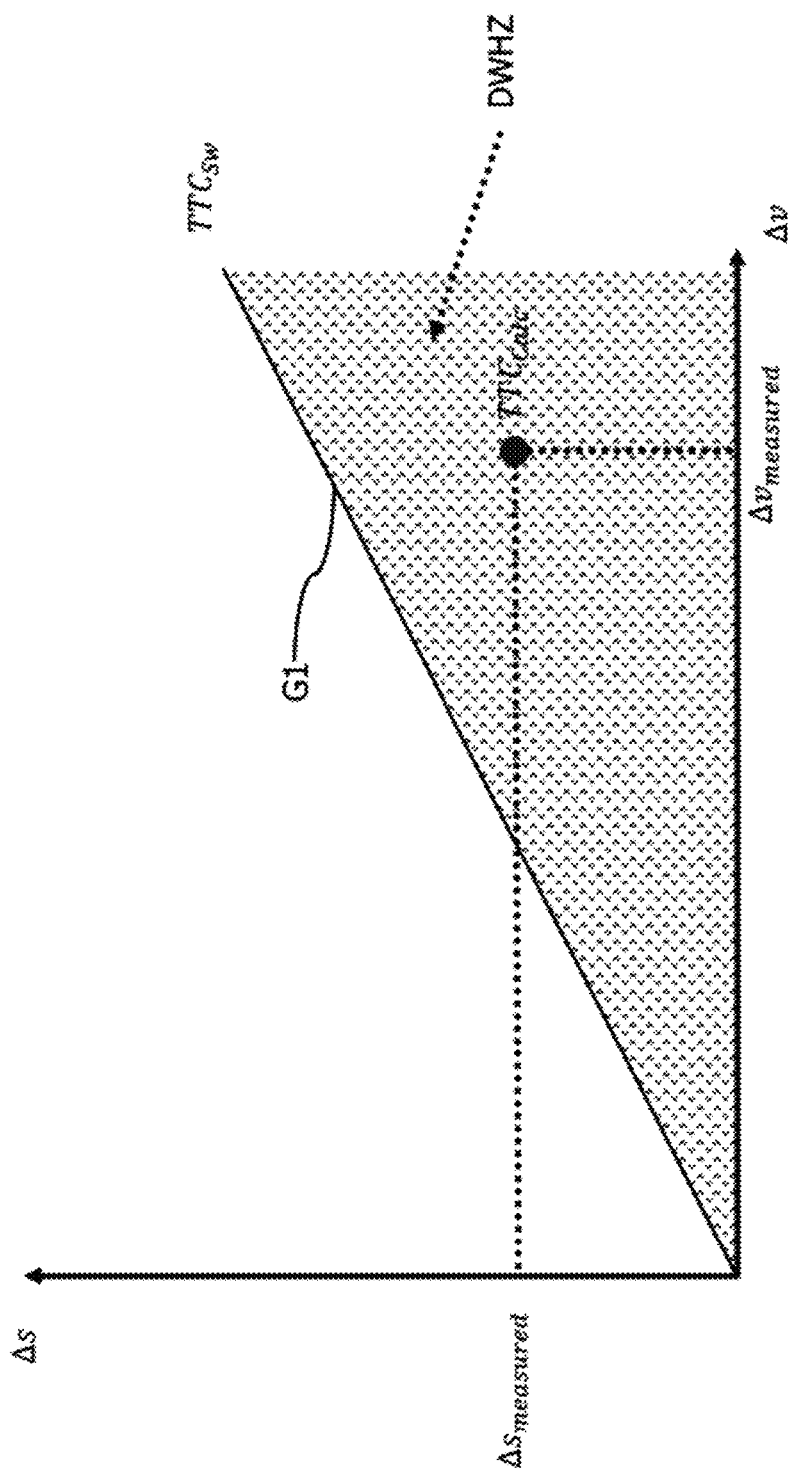
FIG. 4 shows a first exemplary embodiment for an implementation of a TTC-based warning and mitigation measure.

FIG. 4 shows a diagram for the realization of a first exemplary embodiment for the realization of the DWH functions with the function block 130. A diagram is shown in which the relative speed Δv is plotted on the abscissa. Along the ordinate, the distance Δs between subject vehicle 20 and the vehicle ahead 10 is plotted. The radar sensor SU1 provides the distance Δs and the relative speed Δv at short intervals, for example every 10 ms. From this, the so-called TTC value is calculated in the function block 130. This is updated every 10 ms. A TTC threshold value $TTC_{Sw}$ is entered into the software of function block 130. The TTC value is calculated according to the formula $$TTC = \frac{\Delta s}{\Delta v}$$

i.e., for a calculated TTC value, all Δs, Δv value pairs lie on a straight line that passes through the origin of the coordinate system. This line is shown in FIG. 4 for the case of the specified TTC threshold value $TTC_{Sw}$ and is marked with the reference sign G1. As an example, a TTC threshold of $TTC_{Sw}$:=5s is mentioned. Until the impact on the vehicle ahead 20, 5s would remain at the current relative speed, during which the driver should initiate the braking process. In the following, only the case in which the subject vehicle 20 approaches the vehicle 10 ahead is considered. The relative velocity has positive values for this case. In this case, all other TTC values also result in straight lines through the origin that lie in the 1st quadrant of the coordinate system. As long as the subject vehicle 20 is still far enough away from the vehicle ahead 10, there will be no critical TTC value for the usual relative speeds between 0 and 40 km/h. This range of TTC values corresponds to the range shown above the TTC threshold $TTC_{Sw}$. The region filled with a first pattern below the straight line G1 of the TTC threshold value represents the region in which the haptic warning is to be issued to the driver of the vehicle. This pattern corresponds to the pattern used in FIG. 1 for the representation of the haptic warning zone DWHZ. As an example, a point in the filled area where the haptic warning is issued is highlighted. But this is also the case with all other points in the hatched area. As shown, this solution also works with small Δs and Δv values. The linear behaviour does not change in this region. By comparing the respective current TTC value with the TTC threshold value $TTC_{Sw}$, it is determined whether the haptic warning should be issued. If the current TTC value is below the TTC threshold value, the haptic warning is issued. If it is above the TTC threshold value $TTC_{Sw}$, the haptic warning does not occur.

Figure 5:
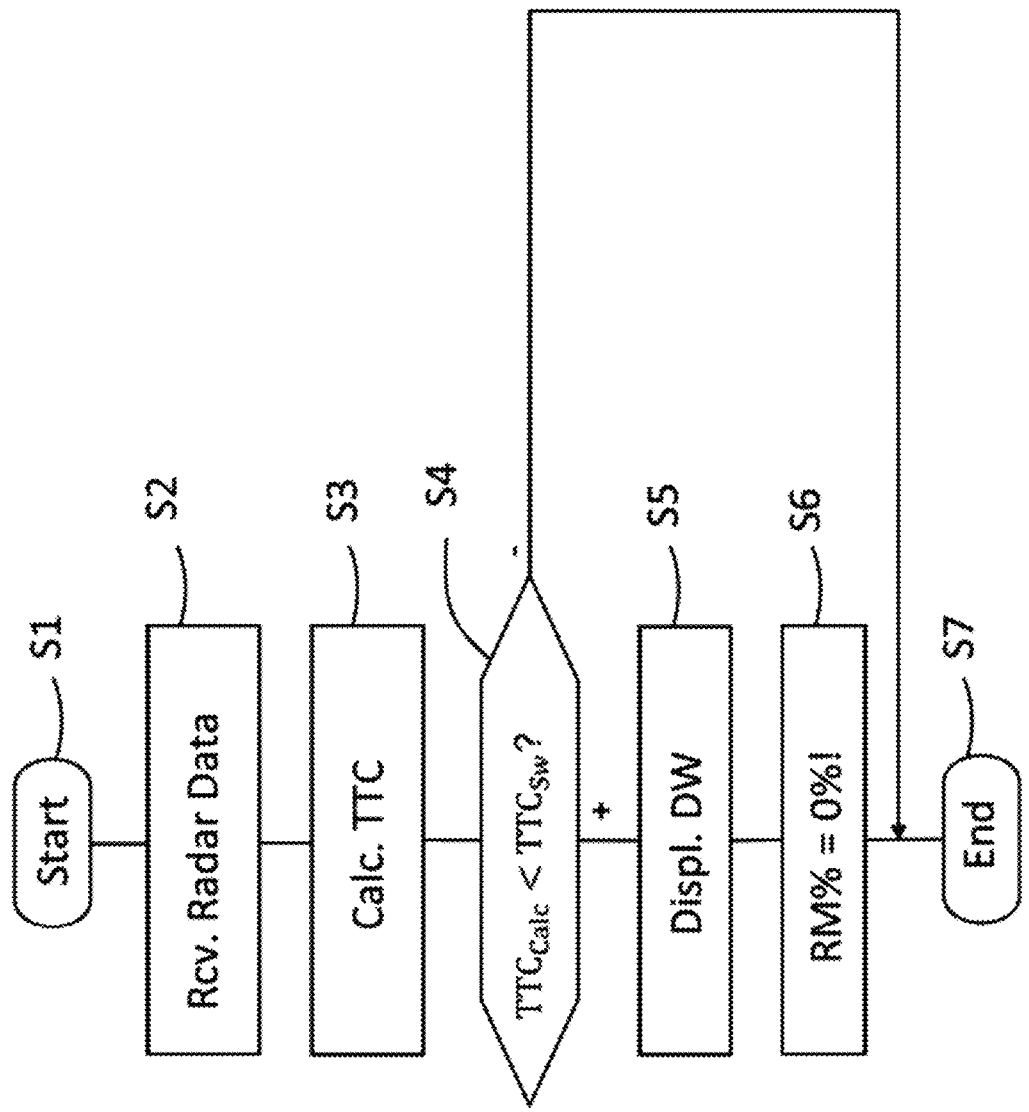
FIG. 5 shows a flowchart for a computer program with which the first exemplary embodiment is implemented.

In the following, the flowchart in FIG. 5 illustrates how this DWH function can be implemented by software. The program is processed by the processor 100 in the framework of the multitasking capability of the processor 100. The program starts in program step S1. The program is called up cyclically, for example also at 10 ms intervals. In the program step S2, the current radar data are received via the communication bus B2. The data include the current data relating to the measured distance Δs to the vehicle ahead 10 and the current relative speed Δv between the subject vehicle 20 and the vehicle ahead 10. In the program step S3, the current TTC value is calculated. This is done according to the formula already given above. In the program step S4, the comparison is made with the TTC threshold value TTCSw. If the current TTC value is greater than or equal to the TTC threshold value TTCSw, the program branches to the end of the program. If the current TTC value is less than the TTC threshold value TTCSw, a message is generated in program step S5 containing a warning addressed to the driver in text or graphical form. This message is transmitted via the communication bus B1 to the gateway unit PU1. This converts the message into the format for the communication bus B5 and forwards the message to the display unit DU. The warning for the driver is displayed there. Typically, the DU display unit is located in the driver's field of view. Typical installation positions are above the centre console and in the instrument cluster. By means of a head-up display, the warning can even be placed specifically in the driver's field of view, so that it can be positioned, for example, on the detected object of the vehicle ahead 20. As a result, the driver immediately becomes aware of the source of danger. Alternatively or additionally, the message can also be forwarded to the speech output unit SA. This can convert the warning into audible speech for the driver and output it in acoustic form. In the next program step S6, a control message is generated which is directed to the electronic control unit CU1. The message contains the command to completely limit the engine torque. The limitation command is RM %=0%. If the driver requests a higher engine torque, this is not set by the engine control unit CU1, since the limitation command sent by the DWH function block 130 is for full limitation. This message is transmitted via the communication bus B1 to the electronic control unit CU1. When the command is executed by the electronic control unit CU1, the engine of the drive system is completely throttled. This creates the desired braking jolt for the haptic warning of the driver. The driver is prompted by this haptic warning in urgent form to intervene in the control of the subject vehicle 20, so that continued driving to close behind the vehicle ahead 10 is prevented. The program then ends in program step S7. Since the program is run cyclically, the engine remains throttled until the current TTC value has risen again to a value above the TTC threshold value $TTC_{Sw}$. It is additionally explained that this embodiment relates to the operation of the DWH function block 130. In addition, the AEB function block 140 is active, which performs the automatic emergency braking. There is an overlap in this variant of the implementation of the DWH function, i.e. the block 140 is also active in the region filled with the pattern below the straight line G1 for the specified TTC threshold value $TTC_{Sw}$.

Figure 6:
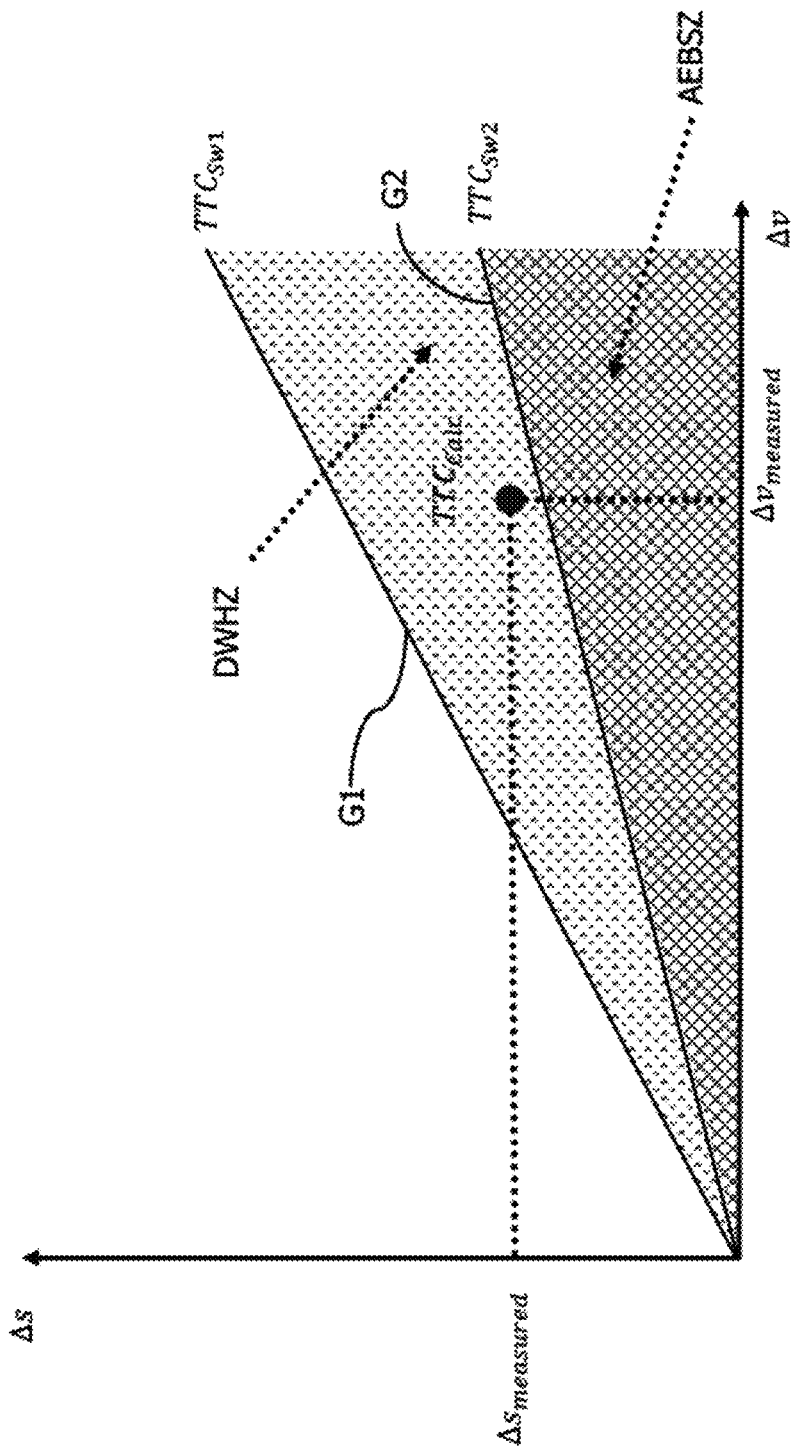
FIG. 6 shows a second exemplary embodiment for an implementation of a TTC-based warning and mitigation measure.

FIG. 6 shows a second exemplary embodiment for the realization of the haptic warning. In this embodiment, the DWH function is executed only in a dedicated region below the straight line G1. For this purpose, two different TTC threshold values $TTC_{Sw1}$ and $TTC_{Sw2}$ are entered in the software. For the TTC threshold value $TTC_{Sw1}$, the same or a similar straight line G2 results in the Δs, Δv diagram as in the first exemplary embodiment. For the second TTC threshold, the straight line G2 is below the first straight line G1. In the case shown in FIG. 6, the region below the first straight line G1 is approximately halved by the second straight line G2. As an example, the TTC thresholds $TTC_{Sw1}:=5$ s and $TTC_{Sw2}:=3$ s are mentioned. The functionality with respect to the first TTC threshold value is the same as in the first embodiment. If the current TTC value is below the first TTC threshold value $TTC_{Sw1}$, the engine is completely throttled. This is done in the entire region filled with the first pattern below the first straight line G1. However, this means that no haptic warning is issued in the region below the second straight line G2. If, despite this throttling, the subject vehicle continues to approach the vehicle ahead 10, and the current TTC value drops so far that it is finally below the second TTC threshold value $TTC_{Sw2}$, automatic emergency braking takes place, which, however, is again carried out by the AEB function block. The region in which the emergency braking takes place lies below the second straight line G2 and is filled with the pattern for the emergency braking zone BZ, see FIG. 1. Ideally, there is no overlap region here in which both function blocks 130 and 140 are active.

Figure 7:
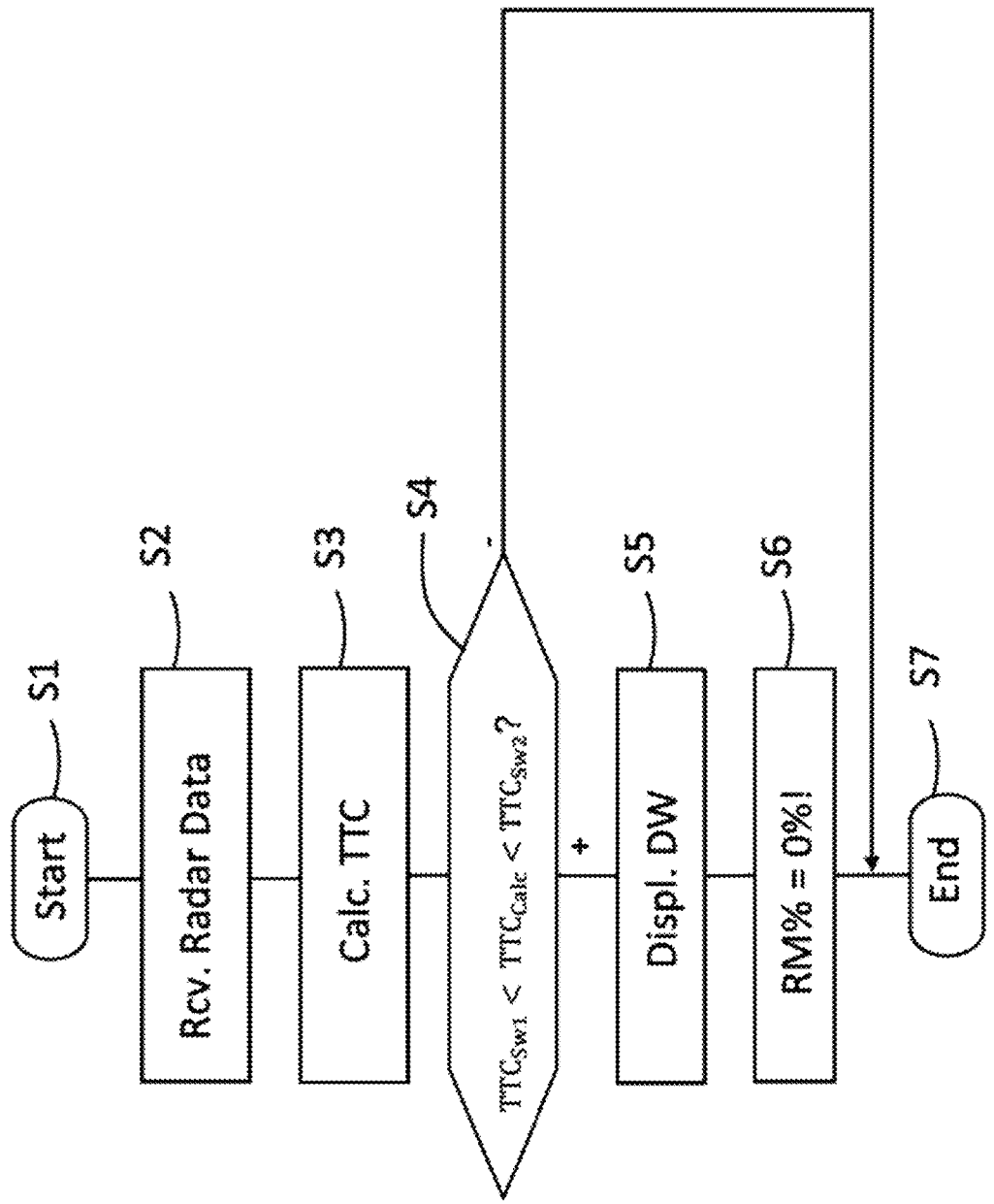
FIG. 7 shows a first variant of a flowchart s for a computer program with which the second exemplary embodiment is implemented.

For the implementation of the second exemplary embodiment, the appropriate flowchart is shown in FIG. 7. The same way of working applies to this program as to the program according to FIG. 5. It is also called up and processed cyclically. The program steps S1 to S3 correspond to the program steps S1 to S3 of the program shown in FIG. 5. After receiving and processing the radar data, an evaluation takes place in program step S4 to determine whether the calculated $TTC_{Calc}$ value is in the range between the first and second TTC threshold values. If the calculated TTC threshold value $TTC_{Calc}$ is still outside the DWH zone DWHZ, the program branches to the end of the program in program step S4. No haptic warning is generated. If the calculated TTC threshold value $TTC_{Calc}$ is in the DWH zone DWHZ, the warning is displayed on the display unit DU in program step S5 and the limitation command for the full limitation of the engine torque of the drive system is transmitted in step S6. The program steps correspond to the program steps S5 and S6 of FIG. 5. The program ends in program step S7. The difference from the implementation according to FIG. 5 is that in program step S4 the current TTC threshold value $TTC_{Calc}$ is compared with both TTC threshold values $TTC_{Sw1}$ and $TTC_{Sw2}$. As a result, the region in which the haptic warning is produced to be set more precisely. For example, it can be adjusted so finely that there is no overlap with the region below the second straight line G2. Below this straight line is the AEBS zone, i.e. the zone where the AEB function block 140 is active and the emergency braking is carried out.

For FIG. 6, another type of implementation is described. This is illustrated in the flowchart according to FIG. 8. In this, the program steps S1 to S5 refer to the same program steps as in FIG. 7. These are therefore not explained again in detail. In program step S6, a calculation takes place that limits the requested engine torque, which for example the driver has requested by pressing the accelerator pedal to generate a dynamic haptic warning. This is done with the formula:

$$RM\% = 100\% \cdot \left(1 - \frac{TTC_{Sw1} - TTC_{Calc}}{TTC_{Sw1} - TTC_{Sw2}}\right)$$

This formula calculates the proportion of the reference engine torque that is allowed for the issuing of the haptic warning. The proportion corresponds to a percentage. If the current TTC value $TTC_{Calc}$ is still close to the TTC threshold value $TTC_{Sw1}$, a large proportion of the reference engine torque is still allowed. The calculated proportion value RM % can then still be close to 100%. The closer the calculated TTC value approaches the second TTC threshold value $TTC_{Sw2}$, the smaller the percentage becomes until it finally drops to zero when the second TTC threshold value $TTC_{Sw2}$ is reached. With the above formula, a linear profile of the transition from 100% to 0% is realized. Depending on which proportion has been calculated in program step S6, a limitation command is then sent to the control unit CU1 of the drive system in program step S7, which limits the engine torque value requested by the driver accordingly. As long as the requested engine torque value is below the engine torque value calculated with the limiting formula, it remains unchanged. However, if the requested engine torque value is higher, it is limited to the calculated engine torque value. If the driver has requested an engine torque value of M=100 Nm, and the proportional value RM % calculated in program step S6 is 80% of the reference engine torque, which is 200 Nm, the requested engine torque value remains unchanged. However, if a value of 180 Nm is requested, this requirement will be limited to the value of 160 Nm. However, the embodiments of the invention are not limited to this method of calculation. With another formula, a nonlinear profile can also be realized. In an alternative embodiment, when the ACC system is active the engine torque is requested from the ACC function block 120 of the driver assistance system ACCS.

Figure 9:
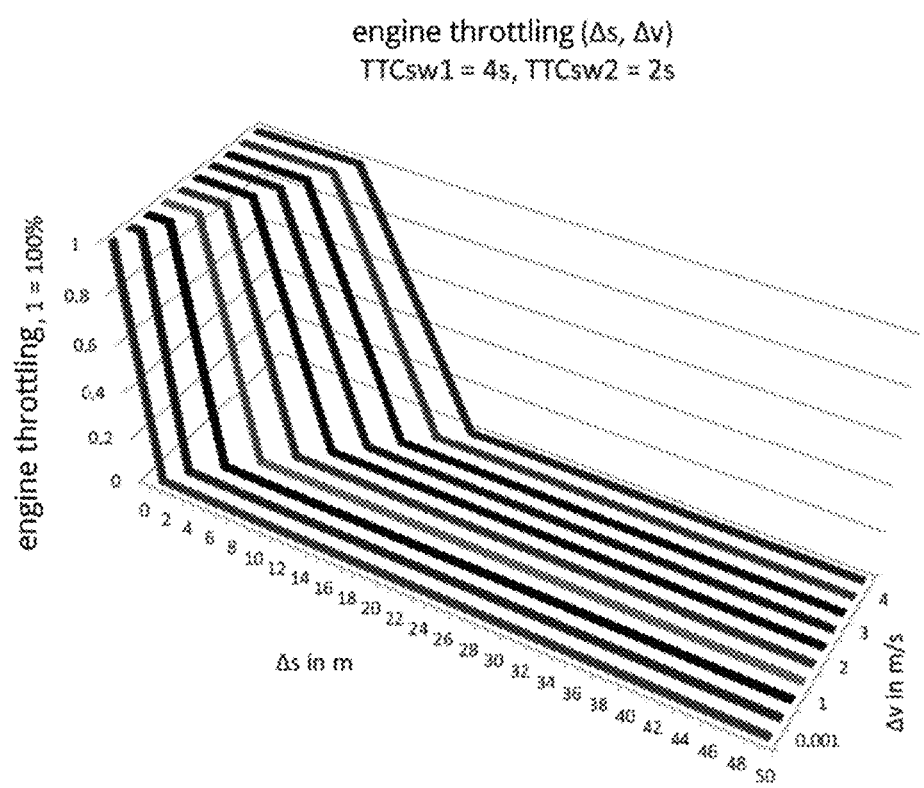
FIG. 9 shows a 3-dimensional representation of exclusively TTC-based engine throttling.

FIG. 9 shows a 3D representation of the effects of engine throttling when the TTC threshold values alone are applied. There, the engine throttling is plotted for different relative speeds Δv as a function of the relative distance Δs. It should be noted that the engine throttling MD % plotted in the vertical direction does not correspond to the permissible proportion of the reference engine torque, but is calculated according to the formula:

MD %=100%−RM %.

In FIG. 9 it can be seen that at low relative speeds, the purely TTC-based engine throttling can lead to very small distances between the subject vehicle 20 and the vehicle ahead 10. This behaviour would have a high criticality at low relative speeds.

Figure 10:
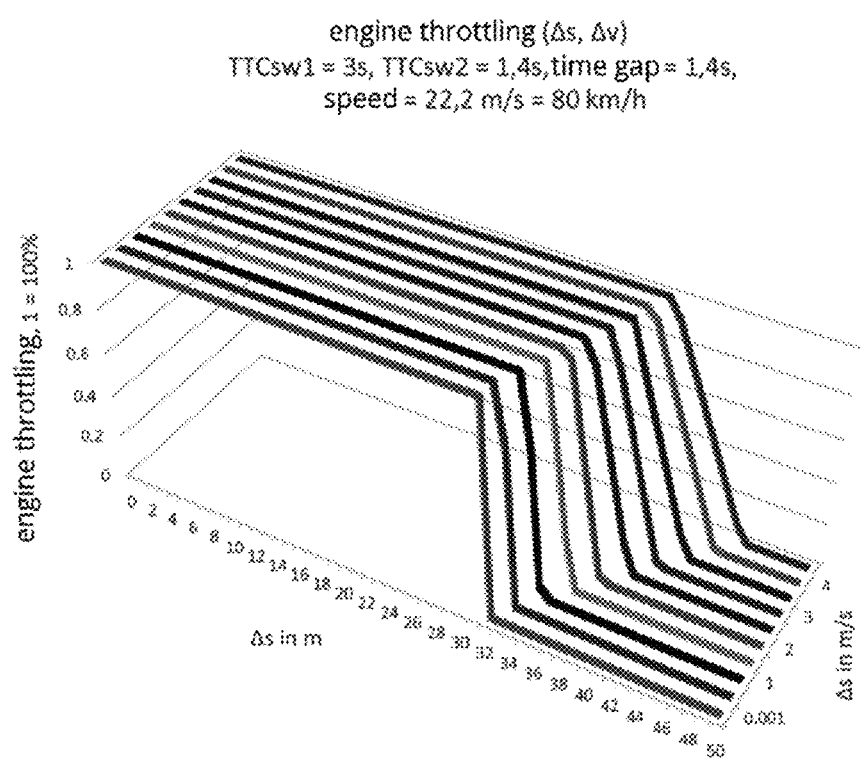
FIG. 10 shows a 3-dimensional representation of TTC-based engine throttling while maintaining a time gap.

FIG. 10 now shows how the engine throttling behaves with additional consideration of a time gap (maintaining an adaptive safety distance). The 3D illustration type is the same as in FIG. 9. The example shown concerns the case in which the TTC threshold value $TTC_{Sw1}$ has a value of 3 s, the TTC threshold value $TTC_{Sw2}$ has a value of 1.4 s, and the speed of the subject vehicle is 22.2 m/s=80 km/h. In this embodiment, a safety distance of 30 m would be maintained even at very low relative speeds.

Figure 8:
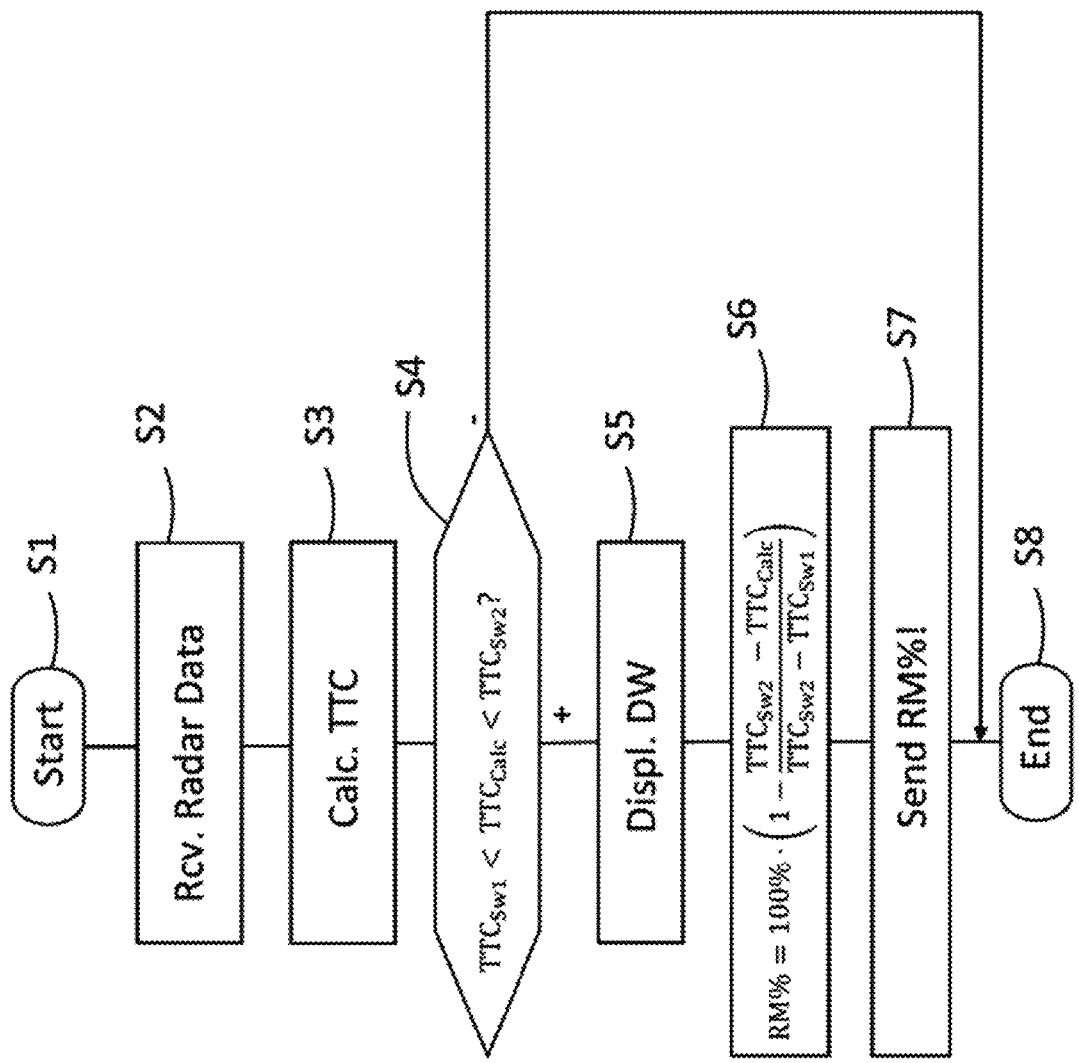
FIG. 8 shows a second variant of a flowchart for a computer program with which the second exemplary embodiment is implemented.

The realization of this variant is just as easy as shown in the flowchart in FIG. 8. In step S6 it is necessary to replace the formula with the formula:

$$RM\% = 100\% \cdot \left(1 - \frac{TTC_{Sw1} - \frac{\Delta s - T_{gap} \cdot v_{ego}}{\Delta v}}{TTC_{Sw1} - TTC_{Sw2}}\right)$$

which has already been explained in detail above. The calculation of the permissible engine torque in step S7 must also be adjusted.

After reaching the one hundred percent engine throttling, the further reinforcement of the braking would be carried out for example by switching on the retarder. For this purpose, the same formula can be used as for the engine throttling. In addition, another threshold value TTC SW3 is introduced, which lies between $TTC_{SW1}$ and $TTC_{SW2}$. This would replace the threshold value $TTC_{SW1}$ in the formula for the retarder control. This would continuously increase the braking with the retarder until it reaches the maximum when the TTC threshold value $TTC_{SW2}$ is reached. In addition, emergency braking takes place, during which the service brake is also applied. The emergency braking can be controlled as usual.

All examples mentioned herein, as well as conditional formulations, are to be understood without limitation to such specifically cited examples. For example, it will be recognized by persons skilled in the art that the block diagram shown here represents a conceptual view of an exemplary circuit arrangement. Similarly, it can be seen that a flowchart, state transition diagram, pseudocode, and the like represent various variants for representing processes that can be substantially stored in computer-readable media and thus executed by a computer or processor.

It should be understood that the proposed method and the associated devices may be implemented in various forms of hardware, software, firmware, specialty processors, or a combination thereof. Specialty processors may include application-specific integrated circuits (ASICs), Reduced Instruction Set Computers (RISC), and/or Field Programmable Gate Arrays (FPGAs). Preferably, the proposed method and device are implemented as a combination of hardware and software. The software is preferably installed as an application program on a program storage device. Typically, it is a machine based on a computer platform that has hardware, such as one or more central processing units (CPU), a random-access memory (RAM) and one or more input/output (I/O) interfaces. An operating system is also typically installed on the computer platform. The various processes and functions described here can be part of the application program or a part that is run by means of the operating system.

The disclosure is not limited to the exemplary embodiments described herein. There is room for various adjustments and modifications that the person skilled in the art would also consider as belonging to the disclosure based on his expertise.

Particular mention is made again of the variant in which the haptic warning is produced in addition to or instead of throttling the drive torque by performing a braking process with an endurance brake and/or a service brake of the subject vehicle. Accordingly, control commands would then be sent from the electronic processing unit CU5 to the electronic processing unit CU2 of the endurance brake (retarder) and/or the electronic processing unit CU4 of the service brake.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST (PART OF THE DESCRIPTION)

10 vehicle ahead
20 subject vehicle
25 brake line
26 service brake
A1 $1^{st}$ antenna
A2 $2^{nd}$ antenna
ACCS driver assistance system
AEBSZ AEBS Zone
B1 $1^{st}$ communication bus
B2 $2^{nd}$ communication bus
B3 $3^{rd}$ communication bus
B4 $4^{th}$ communication bus
B5 $5^{th}$ communication bus
B6 $6^{th}$ communication bus
BS brake system
BZ
CU1 electronic motor control
CU2 electronic retarder control
CU3 electronic transmission control
CU4 electronic brake control
CU5 ADAS control unit with camera
DWHZ DWH zone
DU display unit
FL road surface
G1 $1^{st}$ straight line
G2 $2^{nd}$ straight line
IT1 $1^{st}$ communication interface
IT2 $2^{nd}$ communication interface
IT3 $3^{rd}$ communication interface
IT4 $4^{th}$ communication interface IT5 5<sup>th</sup> communication interface
IT6 6<sup>th</sup> communication interface
KU1 on-board communication module
KU2 telematic communication module
PT drive system
PU1 electronic processing unit (gateway module)
SU1 radar sensor
SU2 camera
S1-S11 various program steps of computer programs
T1 connection socket (Trailer CAN)
WZ
100 processor unit
110 data fusion unit
120 ACC unit
130 DWH unit
140 AEB unit
150 object recognition unit
200 camera lens

The invention claimed is:

1. A method for preventing a subject vehicle from driving into a vehicle ahead, comprising:
   equipping the subject vehicle with at least one brake system, a drive system and a driver assistance system with an emergency braking function:
   issuing a haptic warning when the subject vehicle enters a distance warning zone:
   applying emergency braking on entering an emergency braking zone:
   calculating a relative speed between the subject vehicle and the vehicle ahead;
   continuously calculating a time to collision (TTC) when approaching the vehicle ahead, the TTC indicating a remaining time until the subject vehicle collides with the vehicle ahead at the relative speed;
   specifying a first TTC threshold value for adaptive classification of a distance from the subject vehicle to the vehicle ahead;
   checking, when approaching the vehicle ahead, whether the TTC falls below the first TTC threshold value; and
   if the TTC falls below the first TTC threshold value, issuing a haptic warning to a driver of the vehicle,
   wherein a braking process is carried out as a haptic warning in order to produce a noticeable braking jolt for the driver,
   wherein the haptic warning is generated in the form of the braking process by throttling the drive system and/or by actuating a service brake or an endurance brake,
   wherein a strength of the throttling of the drive system and/or a strength of the braking by the service brake or the endurance brake is proportional to a further approach of the subject vehicle to the vehicle ahead, and
   wherein the strength of the throttling of the drive system is determined by the formula $$RM\% = 100\% \cdot \left(1 - \frac{TTC_{Sw1} - TTC_{Calc}}{TTC_{Sw1} - TTC_{Sw2}}\right)$$

wherein RM % corresponds to a permissible portion of a reference engine torque as a percentage of the reference engine torque,
   wherein $TTC_{Sw1}$ corresponds to the first threshold value,
   wherein $TTC_{Calc}$ corresponds to the calculated current TTC, and
   wherein $TTC_{Sw2}$ corresponds to the second threshold value.

2. The method according to claim 1, comprising:
   specifying a second TTC threshold value:
   checking, with a further approach to the vehicle ahead, a check as to whether the current TTC has reached or falls below the second TTC threshold value; and
   issuing the haptic warning as long as the subject vehicle is in a range from the first TTC threshold value to the second TTC threshold value.

3. The method according to claim 1, wherein instead of a real TTC based on the vehicle ahead, a virtual TTC is calculated based on an adaptive safety distance to the vehicle ahead in the form of a defined time gap to the vehicle ahead.

4. The method according to claim 3, wherein the virtual TTC is calculated according to the formula $$TTC_{Virt} = \frac{\Delta s - T_{Gap} * v_{Ego}}{\Delta v}$$

wherein $T_{Gap}$ corresponds to the selected time gap,
   wherein $v_{Ego}$ corresponds to an instantaneous speed of the subject vehicle,
   wherein $\Delta s$ corresponds to an instantaneous distance between the subject vehicle and the vehicle ahead, and
   wherein $\Delta v$ corresponds to the relative speed between the subject vehicle and the vehicle ahead.

5. The method according to claim 1, wherein the permissible proportion RM % of the reference engine torque as a percentage of the reference engine torque is determined by the formula:

$$RM\% = 100\% \cdot \left(1 - \frac{TTC_{Sw1} - TTC_{Virt}}{TTC_{Sw1} - TTC_{Sw2}}\right)$$

wherein $TTC_{Sw1}$ corresponds to the first threshold value,
   wherein $TTC_{Vrt}$ corresponds to the calculated current virtual TTC, and
   wherein $TTC_{Sw2}$ corresponds to the second threshold value.

6. The method according to claim 1, wherein the haptic warning to the driver of the subject vehicle is accompanied by a warning display on a display unit.

7. The method according to claim 1, comprising issuing a warning on a display unit and/or by an acoustic output when the subject vehicle enters a first distance warning zone extending before the distance warning zone the driver of the subject vehicle.

8. An electronic processor configured to carry out the method according to claim 1, the electronic processor configured to be connected via one or more communication buses to an electronic control unit of the drive system and at least one electronic control unit of the brake system,
   wherein at least one sensor unit is set up to communicate with the electronic control unit of the drive system and the electronic control unit of the brake system and the at least one sensor unit in order to receive sensor data and to transmit control commands to the electronic control unit of the brake system and the electronic control unit of the drive system.

9. A device for preventing a subject vehicle from driving into a vehicle ahead, wherein the subject vehicle is equipped with at least one brake system and a drive system, comprising:

a driver assistance system with an emergency braking function, the driver assistance system including an electronic processor which is connected via one or more communication buses to at least one electronic control unit of the drive system and at least one electronic control unit of the brake system, wherein the electronic processor is connected to at least one sensor unit, wherein the electronic processor is configured to calculate a time to collision (TTC) indicating a remaining time until the subject vehicle collides with the vehicle ahead at an existing relative speed with data of the at least one sensor, and wherein the electronic processor is configured to send a command to reduce a drive torque to the electronic control of the drive system when the electronic processor has determined, by comparing the current TTC with a first TTC threshold value, that the subject vehicle has entered a distance warning zone in order to provide a haptic warning for a driver of the vehicle, wherein the electronic processor is configured to calculate, instead of the real TTC based on the vehicle ahead, a virtual TTC based on an adaptive safety distance to the vehicle ahead in the form of a defined time gap to the vehicle ahead, wherein the electronic processing unit is configured to calculate the virtual TTC according to the formula $$TTC_{Virt} = \frac{\Delta s - T_{Gap} * v_{Ego}}{\Delta v}$$

wherein $T_{Gap}$ corresponds to the selected time gap,
wherein $v_{Ego}$ corresponds to an instantaneous speed of the subject vehicle,
wherein $\Delta s$ corresponds to an instantaneous distance between the subject vehicle and the vehicle ahead,
wherein $\Delta v$ corresponds to a relative velocity between the subject vehicle and the vehicle ahead, and
wherein the electronic processor is configured to calculate a permissible proportion RM % of a reference engine torque as a percentage of the reference engine torque according to the formula:

$$RM\% = 100\% \cdot \left(1 - \frac{TTC_{Sw1} - TTC_{Virt}}{TTC_{Sw1} - TTC_{Sw2}}\right)$$

wherein $TTC_{Sw1}$ corresponds to the first threshold value,
wherein $TTC_{Vrt}$ corresponds to the calculated current virtual TTC, and
wherein $TTC_{Sw2}$ corresponds to the second threshold value.

10. The device according to claim 9, wherein the electronic processor is further configured to send a command to the electronic control unit of the drive system when the electronic processor has determined, by comparing the current TTC with a second TTC threshold value, that the current TTC is not yet below the second TTC threshold value.

11. The device according to claim 9, wherein the sensor unit includes a radar sensor or a lidar sensor and a camera sensor.

12. The device according to claim 9, wherein the driver assistance system is in the form of an adaptive cruise control system with an emergency braking function.

13. The device according to claim 11, wherein the camera sensor is part of the electronic processor of the driver assistance system.

14. A vehicle with a drive system, an electronically controlled brake system and a driver assistance system with an emergency braking function, wherein the vehicle comprises the device according to claim 9.

15. A method for preventing a subject vehicle from driving into a vehicle ahead, comprising:
equipping the subject vehicle with at least one brake system, a drive system and a driver assistance system with an emergency braking function;
issuing a haptic warning when the subject vehicle enters a distance warning zone;
applying emergency braking on entering an emergency braking zone;
calculating a relative speed between the subject vehicle and the vehicle ahead;
continuously calculating a time to collision (TTC) when approaching the vehicle ahead, the TTC indicating a remaining time until the subject vehicle collides with the vehicle ahead at the relative speed;
specifying a first TTC threshold value for adaptive classification of a distance from the subject vehicle to the vehicle ahead;
checking, when approaching the vehicle ahead, whether the TTC falls below the first TTC threshold value; and
if the TTC falls below the first TTC threshold value, issuing a haptic warning to a driver of the vehicle,
wherein a braking process is carried out as a haptic warning in order to produce a noticeable braking jolt for the driver,
wherein the haptic warning is generated in the form of the braking process by throttling the drive system and/or by actuating a service brake or an endurance brake,
wherein a strength of the throttling of the drive system and/or a strength of the braking by the service brake or the endurance brake is proportional to a further approach of the subject vehicle to the vehicle ahead,
wherein instead of a real TTC based on the vehicle ahead, a virtual TTC is calculated based on an adaptive safety distance to the vehicle ahead in the form of a defined time gap to the vehicle ahead, and
wherein the virtual TTC is calculated according to the formula $$TTC_{Virt} = \frac{\Delta s - T_{Gap} * v_{Ego}}{\Delta v}$$

wherein $T_{Gap}$ corresponds to the selected time gap,
wherein $v_{Ego}$ corresponds to an instantaneous speed of the subject vehicle,
wherein $\Delta s$ corresponds to an instantaneous distance between the subject vehicle and the vehicle ahead, and
wherein $\Delta v$ corresponds to the relative speed between the subject vehicle and the vehicle ahead.

* * * * *